Dec. 9, 1958  G. R. NELSON  2,863,347
TORQUE-TRANSMITTING TOOL FOR COUPLING NUTS AND THE LIKE
Filed April 26, 1956
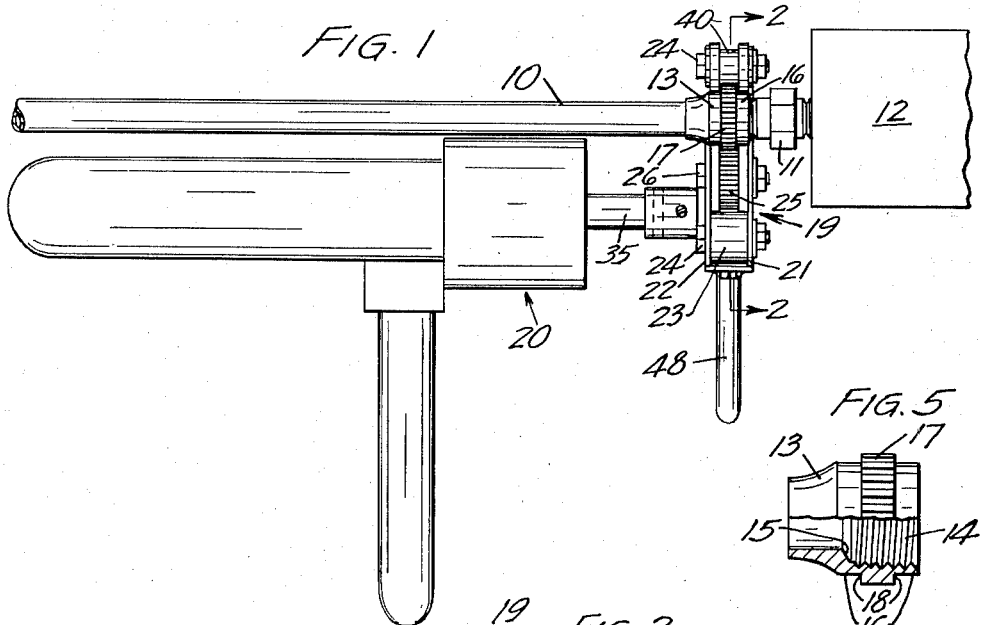
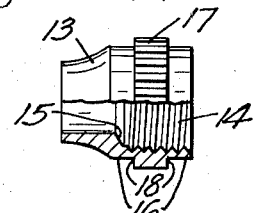
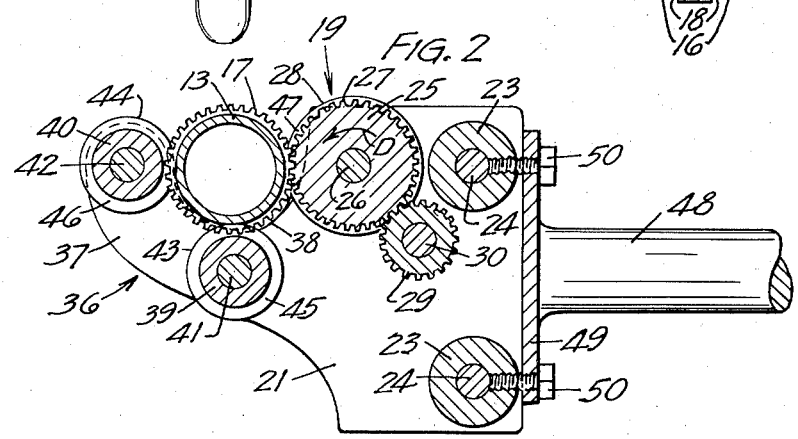
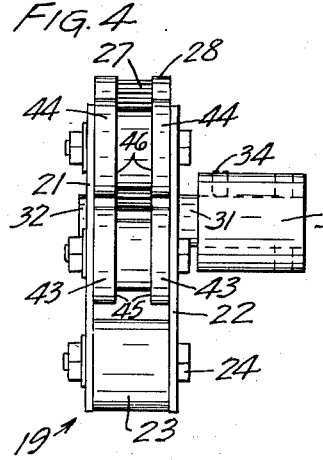
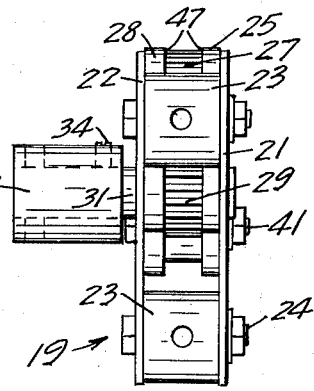
INVENTOR.
GORMAN R. NELSON
BY
Williamson, Schroeder, Adams & Meyers
ATTORNEYS

United States Patent Office 2,863,347
Patented Dec. 9, 1958

2,863,347

TORQUE-TRANSMITTING TOOL FOR COUPLING NUTS AND THE LIKE

Gorman R. Nelson, Sioux Falls, S. Dak.

Application April 26, 1956, Serial No. 580,746

6 Claims. (Cl. 81—52.4)

This invention relates to apparatus for joining hydraulic conduits and the like to fittings, and more particularly relates to a quickly operable coupling nut and a power-driven device for turning the nut.

Power torque wrenches, which have been highly successfully employed in torquing conventional nuts, have not heretofore been readily applicable to coupling nuts and the like for torquing the same. The primary reason for this is that most power torque wrenches have heretofore relied primarily upon sleeve-type sockets for providing a driving connection with the nut to be turned. Because hydraulic conduit coupling nuts are not readily accessible over the ends thereof, such sleeve-type sockets cannot be secured thereon for providing a driving connection. As a result it has been substantially common practice to torque hydraulic nuts and the like by hand, and obviously such hand operation is slow and extremely expensive in the construction of complicated mechanisms such as aircraft wherein large numbers of couplings must be made in conduits of the various hydraulic, air, oxygen, and fuel systems.

Of course in repairing and maintaining hydraulic systems which are constructed in a manner and by the apparatus herein set forth, it may be desirable to have hand operated devices as that disclosed in my application Serial No. 580,745 entitled: Hand Tool for Turning Coupling Nuts and the Like and filed April 26, 1956.

With these comments in mind it is to the elimination of the aforementioned and other disadvantages that my invention is directed along with the inclusion therein of other novel and desirable features.

An object of my invention is to provide a new and improved torque-transmitting device of simple and inexpensive construction and operation which is well adapted for quickly turning nuts, such as hydraulic conduit coupling nuts and the like, which are so disposed and mounted in such a manner that ready access cannot be had to the peripheral surfaces thereof from over the ends of the nuts.

Another object of my invention is to provide a novel nut and torquing device therefor to provide for quickly and easily connecting a conduit or the like to a fitting and which nut and torquing device are constructed to cooperate for maintaining a positive driving relation with respect to each other during the torquing operation.

Still another object is to provide an improved torque-transmitting device which is quickly attachable to a coupling nut or the like for turning the same and which is continuously urged toward the nut and positively maintained in driving relation therewith when torquing power is applied thereto.

A further object of my invention is the provision of a new device for transmitting torque to a nut and which engages the nut in such a manner that slipping of the torque-transmitting device relative to the nut is virtually impossible.

A still further object of my invention is to provide a novel and improved externally toothed nut and a rotary power transmitting device cooperatively arranged with respect to the nut for engaging and exerting torque on the nut in such a manner that deformation or damage to the nut is extremely unlikely.

These and other objects and advantages of my invention will more fully appear from the following description made in connection with the accompanying drawings wherein like reference characters refer to similar parts throughout the several views and in which:

Fig. 1 is a plan view of the invention applied to a nut and drivably coupled with a power torquing device;

Fig. 2 is a detail vertical section view of the invention taken on a plane indicated substantially at 2—2 in Fig. 1;

Fig. 3 is a front elevation view of the invention with the handle and mounting plate removed;

Fig. 4 is a rear elevation view of the invention; and

Fig. 5 is an elevation view, partly broken away of a hydraulic nut incorporating a portion of the present invention.

One form of the present invention is shown in the drawings and is described herein. The present invention is primarily for the purpose of securing an elongated body such as a conduit 10 to a threaded fitting 11 which is suitably secured to a mounting structure such as housing 12. In one application, it may be desired to forcibly carry lubricating oil through the conduit 10 to a motor housing.

As a portion of the present invention, I provide a conduit coupling nut 13 which is generally conventionally constructed and in the form shown, the nut 13 comprises a generally annular body having internal threads 14 and having an internal shoulder surface 15 engageable with a flared end on the conduit. Nut 13 is provided with a pair of smooth and cylindrical outer bearing surfaces 16 which are spaced from each other along the rotation axis of the nut. A plurality of outwardly projecting driving teeth 17 are formed on the external periphery of the nut and are disposed between the cylindrical bearing surfaces 16. The opposite ends of teeth 17 define guiding or shoulder surfaces 18 which are disposed in planes which extend generally transversely through the nut and transversely of the rotation axis thereof.

The present invention also includes a tightening tool indicated in general by numeral 19 which comprises a torque-transmitting attachment device adapted for driving connection with a source of rotary power such as a predetermined torque release wrench 20 which delivers power up to a predetermined torque. The torque wrench 20 itself comprises no portion of the present invention and may be of any suitable type such as that disclosed in my United States Patent No. 2,687,054 issued August 24, 1954. The torque-transmitting device 19 has a frame which includes a pair of spaced and rigid frame plates 21 and 22, a pair of rigid spacer elements 23 disposed between the plates 21 and 22, and a pair of interconnecting bolts 24 which extend centrally through the hollow spacer elements 23 and through suitably provided apertures in the plates for maintaining the plates in mutually spaced and fixed relation.

Means are provided for providing a driving connection between the source of rotary power and the nut 13 to be turned. A nut-engaging rotary driving element or wheel 25 is disposed between the plates 21 and 22 and is journalled upon an axle or bolt 26 which extends through suitably provided apertures in the frame and is affixed thereto as by a nut. The rotary driving wheel 25 is provided with a plurality of external driving teeth 27 formed in the outer periphery thereof for engaging the teeth 17 of nut 13 in meshed driving relation and teeth 27 are of complementary shape with respect to teeth 17 to facilitate the meshed relation. Wheel 25 is also provided with a pair of axially spaced cylindrical bearing surfaces 28 which are disposed on opposite sides of the teeth 27 and which are disposed, in the form shown, radially outwardly a small distance from the external termini of teeth 27. Such driving connection means also includes an externally toothed rotary power transmitting element or gear 29 which is affixed to a driving shaft 30 and which is disposed in meshed and driving relation with rotary driving wheel 25. Shaft 30 is journalled in a pair of bearings 31 and 32, as best seen in Fig. 4 which provide bearing surfaces on the opposite sides of gear 29 for engaging the bearing surfaces 28 of rotary driving wheel 25. Shaft 30 is affixed to a coupling sleeve 33 as by set screw 34 and the sleeve 33 may receive and be affixed to the rotary driving output shaft 35 of the power source 20 to complete the driving connection between wheel 25 and the power source.

The torque-transmitting device 19 is also provided with means for engaging the nut 13 and maintaining the nut teeth and the teeth of the rotary driving wheel in meshed and driving relation, and in the form shown, such means comprise a cradle structure indicated generally by numeral 36 and which includes a pair of upwardly curved and rearwardly extending mounting arms 37 which are formed integrally with the frame plates 21 and 22. The upper edges 38 of arms 37 are arcuately formed adjacent the driving wheel 25 for defining a nut and conduit-receiving recess. The cradle structure 36 includes a pair of supporting rollers 39 and 40 which are spaced from each other and from the rotary driving wheel 25 on an arc which generally subscribes the outer periphery of nut 13. Rollers 39 and 40 are positioned around only one side of the circumference of the nut and it will be noted that roller 40 is disposed substantially diametrically across the nut from the rotary driving wheel 25. Rollers 39 and 40 are journalled on axles or bolts 41 and 42 respectively which are affixed to the arms 37 of the frame plates. Rollers 39 and 40 provide nut-engaging bearing surface portions which are defined by axially spaced cylindrical surfaces 43 and 44 respectively. The roller 39 is recessed radially inwardly from the axially spaced bearing surfaces 43 for receiving the externally protruding teeth of nut 13 and the roller 40 is similarly radially recessed between its spaced cylindrical bearing surfaces 44. The rollers 39 and 40 are in effect flanged adjacent their oposite ends and are each provided with a pair of axially spaced and opposed annular guiding or shoulder surfaces 45 and 46 respectively for engaging the end guiding surfaces 18 of teeth 17.

The rotary driving wheel 25 is also provided with a pair of axially spaced and opposed guiding surfaces 47 which are disposed at the ends of teeth 27 and in planes extending transversely of the rotation axis. Guiding surfaces 47 are cooperatively formed wtih respect to the end surfaces 18 of the nut teeth 17 for engaging the same.

As best seen in Fig. 2, a handle 48 having a mounting plate 49 at the inner end thereof may be affixed as by bolts 50 to the rigid spacing elements 23 to restrict rotary movement of the frame when torquing power is being applied to the nut.

In operation, the nut 13 is normally rotatably mounted on the conduit 10 for connection with the fitting 11. The threaded connection between the nut 13 and fitting 11 may be started by hand. The torque-transmitting device 19 will be coupled to the output drive shaft 35 of the rotary power source as seen in Fig. 1. When the torque-transmitting device 19 is to be applied to the nut, the teeth of the rotary driving wheel 25 will be meshed with the teeth of the nut and by moving the frame toward the nut, the nut will roll peripherally of the wheel 25 to be seated on the rollers 39 and 40. The cylindrical surfaces 43 and 44 of rollers 39 and 40 respectively and the cylindrical bearing surfaces 28 of the rotary driving wheel 25 will engage the cylindrical bearing surfaces 16 of the nut. The opposed guiding surfaces 45 and 46 of the rollers 39 and 40 respectively and the opposed guiding surfaces 47 of the rotary driving wheel 25 will be disposed in face-to-face relation with the guiding surfaces 18 at the opposite sides of the nut teeth 17 and will restrict movement of the torque-transmitting device 19 in an axial direction relative to the nut 13. Rotary power will be applied from the source 20 to turn the rotary driving wheel 25 in the direction of arrow D as seen in Fig. 3, thereby moving that portion of the driving teeth 27 which is engaged and meshed with the teeth of nut 13 inwardly toward the cradle structure. The frame will, of course, be held stationary, so that rotation of the driving wheel 25 will revolve the nut on the conduit. Because the meshed portion of the nut teeth 17 are urged inwardly toward the cradle by the rotary driving wheel, the nut will exert substantial pressure against the bearing surfaces 43 and 44 of the rollers 39 and 40, and the rollers 39 and 40 will hold the nut and driving wheel in driving relation wherein the teeth are maintained in meshed relation. This same convergent pressure between the nut and rollers 39 and 40 will maintain the transverse guiding surfaces 45 and 46 of the rollers and surface 47 of the driving wheel in face-to-face relation with the end surfaces 18 of the nut to preclude any possibility of slippage of the torque-transmitting device in a direction axially of the nut.

Because the torque-transmitting device provides a direct driving connection between the source of rotary power and the nut 13, the torque exerted on the nut may be accurately controlled by varying the torque output of the power source 20. The nut 13 may be torqued to the desired tightness.

When the torquing apparatus is to be removed from the nut, it is necessary to stop the application of torque from the power source 20 and then merely lift or drop the torque-transmitting device 19 off the nut. The frame may be swung to disengage the rollers from the nut or the drive wheel 25 may be rotated slightly in a reverse direction.

The cylindrical bearing surfaces 28 of the rotary driving wheel 25 and the cylindrical bearing surfaces 16 of the nut continuously engage each other to prevent the nut teeth 17 and the driving wheel teeth 27 from jamming together. Inward or radially directed forces applied on either set of rotary teeth are thereby maintained at a minimum, which is dependent upon the pressure angle of the teeth.

It should also be noted that the torque-transmitting device 19 may be applied to the nut before the nut has been started on the threaded fitting 11. Turning of the rotary driving wheel 25 in the direction indicated will cause the nut to be securely contained within and seated on the cradle structure and when the conduit 10 is aligned with the fitting 11 so as to align the threads of the nut with the threads of the fitting, the nut may be urged, by manual manipulation of the torque-transmitting device 19, toward the fitting 11 to start the threading of the nut thereon. Manual manipulation of the nut may thereby be eliminated.

It will be seen that I have provided a new and improved hydraulic nut and tightening tool therefor, to facilitate the ready and easy coupling of a hydraulic conduit or the like to a threaded fitting and to apply the desired degree of torque on the nut by means of a power-driven torquing device.

It also should be apparent that I have provided a new and improved torque-transmitting device which is adapted for quick and easy application to an externally toothed hydraulic nut in such a manner that when torque is applied, a positive driving connection is maintained between the tool and the nut and slippage of the tool relative to the nut is virtually precluded.

It will, of course, be understood that various changes may be made in the form, details, arrangement and proportions of the parts without departing from the scope of my invention which consists of the matter shown and described herein and set forth in the appended claims.

What is claimed is:

1. A tool for applying torque to a nut having a generally cylindrical periphery with a plurality of teeth therearound and defining at their ends, guiding surfaces in planes which extend transversely of the nut axis, said tool comprising a frame, a rotary driving wheel on the frame and having a plurality of teeth around the periphery thereof and adapted for meshing with the teeth of the nut, said wheel having guiding surfaces axially spaced from each other at the opposite ends of the teeth and disposed in planes extending transversely of the wheel rotation axis, the guiding surfaces of the wheel and the guiding surfaces of the nut engaging each other when the teeth are meshed to restrict relative axial movement of the nut and wheel, and a cradle structure on the frame and being spaced from the wheel periphery and cooperatively arranged with the cylindrical bearing surfaces of the nut to accurately maintain a meshed relation between the teeth of the nut and of the wheel, and torque applying means connected with the wheel to facilitate application of torque to the nut.

2. A tool for applying torque to a nut having a substantially circular periphery with a plurality of teeth the periphery thereof and also having axially spaced guiding surfaces in planes transverse to the nut rotation axis, said tightening tool comprising a frame, an externally toothed rotary driving wheel on the frame, said tool also having a cradle structure on the frame and spaced from the periphery of said driving wheel, said cradle structure having nut engaging portions spaced from each other and from said wheel in an arc similar to the peripheral contour of the nut for engaging the nut periphery and maintaining a meshed relation between the teeth of the nut and wheel, and said cradle structure also having spaced guide surfaces complementarily arranged with respect to the guiding surfaces of the nut for engaging the same and precluding relative axial movement between the nut and the cradle structure, and torque applying means connected with the wheel to facilitate application of torque to the nut.

3. A tool for applying torque to a nut having a substantially circular periphery with a plurality of teeth formed therein, said tool comprising a frame, an externally toothed rotary driving wheel on the frame with the teeth thereof adapted for meshing with the teeth of the nut, a cradle structure on the frame and including spaced nut-engaging portions for holding the nut and wheel teeth in meshed driving relation, said nut-engaging portions being disposed within a semi-circular arc which includes the driving wheel and which substantially subscribes the peripheral contour of the nut, whereby the wheel and cradle structure engage only one side of the nut periphery and whereby when torque is applied in one direction by the wheel, the nut is positively gripped by the wheel and cradle structure, and torque applying means connected with the wheel to facilitate application of torque to the nut.

4. A tool for applying torque to a nut having a cylindrical periphery with outwardly projecting gear teeth intermediate the ends thereof, said tool comprising a frame, an externally toothed rotary driving wheel on the frame with the teeth thereof adapted for meshing with the teeth of the nut, a cradle structure on the frame and including a roller on the frame and spaced from the driving wheel to engage and support the nut against the driving wheel, said roller having a pair of spaced annular flanges which define radially outwardly facing bearing surfaces engaging the annular bearing surfaces of the nut and said flanges also defining a pair of spaced and opposed annular guiding surfaces for engaging the ends of the projecting teeth on the nut and restraining lateral movement of the tool with respect to the nut, and torque-applying means connected with the wheel to facilitate application of torque to the nut.

5. In apparatus for connecting a rotary power source to an externally toothed coupling nut, said apparatus comprising a frame, an externally toothed rotary driving wheel adapted for engagement with the teeth of such a nut, said wheel having a pair of substantially cylindrical bearing surfaces adjacent the teeth for bearing against the nut periphery and supporting the nut on the wheel whereby only torque is exerted by the wheel teeth on the nut, a cradle structure on the frame including a roller spaced from the driving wheel and having a pair of spaced annular flanges engageable with the nut and the ends of the teeth thereof for maintaining a meshed driving relation between the wheel and nut and restricting axial movement of the wheel on the nut, and a rotary coupling element on the frame and drivably connected with the wheel and being constructed and arranged for releasable attachment to the source of rotary power.

6. In apparatus for transmitting torque from a rotary power source to a nut of the type having a plurality of driving teeth around the periphery thereof, said apparatus comprising a frame, an externally toothed rotary driving wheel on the frame, a cradle structure on the frame and spaced from the periphery of said driving wheel for supporting the nut in meshed driving relation with the wheel, said cradle structure having nut-engaging portions spaced from each other in a direction endwise of the wheel and also spaced from the wheel around an arc similar to the peripheral contour of the nut, said cradle structure also having spaced and opposed guide surfaces for engaging the ends of the teeth on the nut and precluding axial movement of the frame and wheel relative to the nut, and a rotary coupling element on the frame and drivably connected with the wheel, said coupling element being constructed and arranged for releasable attachment to such a source of rotary power, whereby the cradle structure will hold the nut and driving wheel in meshed driving relation to provide a positive drive connection between the rotary driving source and the nut.

References Cited in the file of this patent

UNITED STATES PATENTS

| | | |
|---|---|---|
| 1,970,721 | Walton | Aug. 21, 1934 |
| 2,341,775 | Hawk | Feb. 15, 1944 |
| 2,558,897 | Akins | July 3, 1951 |
| 2,590,706 | Isaac | Mar. 25, 1952 |
| 2,641,136 | Marsden et al. | June 9, 1953 |
| 2,664,020 | DeNote | Dec. 29, 1953 |
| 2,757,563 | Hayward | Aug. 7, 1956 |